United States Patent Office.

JULIUS POLLOCK, OF MORRISANIA, NEW YORK.

Letters Patent No. 79,499, dated June 30, 1868.

IMPROVEMENT IN PURIFYING WOOD-SPIRITS.

*The Schedule referred to in these Letters Patent and making part of the same.*

TO ALL WHOM IT MAY CONCERN:

Be it known that I, JULIUS POLLOCK, of Morrisania, in the county of Westchester, in the State of New York, have invented a new and useful Improvement in the Manufacture of Pyroxylic Spirit; and I do hereby declare that the following is a full and exact description thereof.

The nature of my invention consists in purifying and deodorizing the crude pyroxylic spirit, by separating from it the fixed and volatile oils and other impurities.

To enable others skilled in the art to use my invention, I will proceed to describe my process.

I first dilute the crude spirit with twice its volume of water, agitating the mixture during the operation. This separates the fixed oils, which rise to the surface of the mixture after standing, and may be removed by skimming or otherwise. The spirit is then filtered through freshly-burned charcoal, and concentrated by distillation.

What I claim, and desire to secure by Letters Patent, is—

The process of purifying pyroxylic spirit, substantially as herein described.

JULIUS POLLOCK.

Witnesses:
SILAS D. GIFFORD,
THOMAS ROGERS.